(12) United States Patent
Al-Otaibi et al.

(10) Patent No.: US 9,546,316 B2
(45) Date of Patent: Jan. 17, 2017

(54) DENSIFYING CARBON DIOXIDE WITH A DISPERSION OF CARBON DIOXIDE-PHILIC WATER CAPSULES

(71) Applicant: SAUDI ARABIAN OIL COMPANY, Dhahran (SA)

(72) Inventors: Fawaz Al-Otaibi, Dhahran (SA); Yun Chang, Dhahran (SA); Sunil Kokal, Dhahran (SA); Howard Schmidt, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 481 days.

(21) Appl. No.: 14/074,901

(22) Filed: Nov. 8, 2013

(65) Prior Publication Data
US 2014/0131046 A1 May 15, 2014

Related U.S. Application Data

(60) Provisional application No. 61/725,183, filed on Nov. 12, 2012.

(51) Int. Cl.
*C09K 8/594* (2006.01)
*E21B 43/16* (2006.01)
(Continued)

(52) U.S. Cl.
CPC ............. *C09K 8/594* (2013.01); *B01J 13/16* (2013.01); *B01J 13/20* (2013.01); *E21B 43/164* (2013.01); *Y02P 90/70* (2015.11)

(58) Field of Classification Search
CPC .............................. E21B 43/164; C09K 8/594
See application file for complete search history.

(56) References Cited

U.S. PATENT DOCUMENTS 3,782,472 A * 1/1974 Siess, Jr. ............... C09K 8/592
                                                    166/303
4,249,606 A   2/1981 Kalfoglou
(Continued)

FOREIGN PATENT DOCUMENTS

WO     9606118 A1   2/1996
WO     9637535 A1   11/1996
(Continued)

OTHER PUBLICATIONS

Hoefling, T., et al.; The Incorporation of a Fluorinated Ether Functionality Into a Polymer or Surfactant to Enhance C02-Solubility; The Journal of Supercritical Fluids; Dec. 31, 1992; pp. 237-241; vol. 5; PRA Press.
(Continued)

*Primary Examiner* — Catherine Loikith
*Assistant Examiner* — Ryan Schneer
(74) *Attorney, Agent, or Firm* — Bracewell LLP; Constance G. Rhebergen; Kevin R. Tamm

(57) ABSTRACT

This invention generally relates to the field of oil recovery from reservoirs. More specifically, it relates to the recovery of oil from sandstone and carbonate reservoirs using a process for preparing a dispersion of capsules for use downhole including the steps of providing capsules containing a dense liquid, each capsule having a capsule wall defining an inner area, the capsule wall having an outer side. The capsules are functionalized by adding a carbon dioxide-philic compound to the outer side of the capsule wall. A dispersion is then prepared by adding the functionalized capsules to supercritical carbon dioxide such that a stable dispersion of capsules in supercritical carbon dioxide is achieved.

16 Claims, 2 Drawing Sheets

(51) Int. Cl.
*B01J 13/16* (2006.01)
*B01J 13/20* (2006.01)

(56) References Cited

U.S. PATENT DOCUMENTS

| | | | |
|---|---|---|---|
| 4,609,043 | A | 9/1986 | Cullick |
| 4,921,576 | A | 5/1990 | Hurd |
| 4,964,467 | A | 10/1990 | Holtmyer et al. |
| 5,312,882 | A | 5/1994 | DeSimone et al. |
| 5,358,046 | A | 10/1994 | Sydansk et al. |
| 5,688,870 | A | 11/1997 | Wilkinson et al. |
| 5,733,964 | A | 3/1998 | Johnston et al. |
| 5,814,678 | A | 9/1998 | Randolph |
| 6,176,895 | B1 | 1/2001 | DeSimone et al. |
| 6,686,438 | B1 | 2/2004 | Beckman et al. |
| 2003/0072716 | A1* | 4/2003 | Poovathinthodiyil ...... A61K 9/1623 424/43 |
| 2004/0158013 | A1 | 8/2004 | Beckman et al. |
| 2006/0039983 | A1 | 2/2006 | Shekunov et al. |
| 2011/0198101 | A1 | 8/2011 | Sanders et al. |
| 2012/0214219 | A1 | 8/2012 | Aines et al. |
| 2013/0274170 | A1* | 10/2013 | Yuan-Huffman ...... A61Q 19/00 510/337 |

FOREIGN PATENT DOCUMENTS

| | | |
|---|---|---|
| WO | 0035998 A2 | 6/2000 |
| WO | 03/082459 A1 | 10/2003 |

OTHER PUBLICATIONS

Orr, F. M., et al., Carbon Dioxide Flooding and Enhanced Oil Recovery: Promise and Problems; Presented at the Annual Meeting of the American Oil Chemists Society; Toronto, Canada; May 2-6, 1982.

Sarbu, T., et al.; Design and Synthesis of Low Cost, Sustainable C02-Philes; Ind. Eng. Chem. Res.; Dec. 31, 2000; pp. 4678-4683; vol. 39.

Shi, C., et al.; Semi-Fluorinated Trialkyltin Fluorides and Fluorinated Telechelic Ionomers as Viscosity-Enhancing Agents for Carbon Dioxide; Ind. Eng. Chem. Res.; Dec. 31, 2001; pp. 908-913; vol. 40; American Chemical Society.

PCT Partial International Search Report of the International Searching Authority dated Jun. 4, 2014; International Application No. PCT/US2013/069647; International File Date: Nov. 12, 2013.

Database WPI; Week 201021; Thomson Scientific, London, GC; AN 2010-C61802; (XP002724822); & CN 101 654 515 A; Chengdu Organic Chem Co. Ltd., Chinese Acad; Feb. 24, 2010.

Sarkara, M., et al.; Generation of Microparticles Using C02 and C02-Philic Antisolvents; AIChE Journal; Sep. 1, 2000; pp. 1850-1859; vol. 46, No. 9; Department of Chemical and Materials Engineering, University of Kentucky, Lexington, KY.

PCT The International Search Report and The Written Opinion of the International Searching Authority dated Aug. 25, 2014; International Application No. PCT/US2013/069647; International File Date: Nov. 12, 2013.

* cited by examiner

DENSIFYING CARBON DIOXIDE WITH A DISPERSION OF CARBON DIOXIDE-PHILIC WATER CAPSULES

This application claims priority to U.S. Provisional Application Ser. No. 61/725,183 filed on Nov. 12, 2012, which is incorporated by reference in its entirety.

FIELD OF INVENTION

This invention generally relates to the field of oil recovery from reservoirs. More specifically, it relates to the recovery of oil from sandstone and carbonate reservoirs.

BACKGROUND

Carbon dioxide flooding processes are an important enhanced oil recovery method to recover oil from both sandstone and carbonate reservoirs. Approximately one third of the original oil in place is recovered by primary and secondary recovery processes. However, this typically leaves two-thirds of the oil trapped in reservoirs as residual oil after water flooding. An additional 5-20% of the oil may be recovered by carbon dioxide flooding processes. However, increasing the recovery beyond this has remained difficult because of several challenges. First is the gravity override of the injected carbon dioxide due to density differences between the injected carbon dioxide and resident fluids in the reservoir. The carbon dioxide, being lighter, tends to rise to the top of the reservoir thereby bypassing some of the remaining oil, This results in poor oil recovery in the lower portion of the reservoir. This problem is especially acute in thick formations. The second challenge is viscous fingering that is caused by the lower viscosity of the injected carbon dioxide. Typical dense carbon dioxide viscosity at reservoir conditions is in the range of 0.05-0.1 cP, which is much lower than the viscosity of resident oil and brine. The resulting unfavorable mobility ratio leads to viscous fingering. This causes early carbon dioxide breakthrough, high carbon dioxide utilization factors, poor sweep efficiency, and low overall oil recoveries. The third challenge is reservoir geology and heterogeneities, including high permeability streaks and fractures that can affect the sweep efficiency of a carbon dioxide enhanced oil recovery flooding processes. While water-alternating-gas processes have shown to improve the mobility of carbon dioxide somewhat, water-alternating-gas processes have not completely overcome these challenges.

Increasing the density and viscosity of carbon dioxide can alleviate many of these challenges and lead to substantial higher recovery than conventional carbon dioxide enhanced oil recovery processes. Carbon dioxide density can be increased by blending in heavier compatible materials. However, limited success has been achieved using this approach, partly because the densities of the molecules that have previously been used are not high enough.

Additionally, known methods use surfactants to foam or to create water in carbon dioxide reverse micelles. While creating a foam addresses the challenge of viscosity, it leaves the challenge of density unresolved. Although research results have demonstrated that surfactant-induced carbon dioxide foams are an effective method for mobility control in carbon dioxide foam flooding, the foam's long-term stability during a field application is difficult to maintain.

Moreover, even if a carbon dioxide thickener, whether a polymer or small molecule, is identified, operational constraints may face operators who would try to implement the technology in a pilot-test. Nearly all potential carbon dioxide thickeners are a solid at ambient temperature and a means of introducing a powder into the carbon dioxide stream must be employed, possibly by first dissolving the thickener in an organic solvent in order to form a concentrated, viscous, pumpable solution.

Reverse micelles carry a small amount of water with a significant amount of surfactant due to the nature of micelles. In other words, micelles carry little payload due to their high surface to volume ratios.

A capsule based carbon dioxide system addresses the density challenge by delivering a substantial amount of a dense liquid, such as water or heavy filler. The surface-volume ratio of the capsule is much smaller than that of reverse micelle, hence more payload can be added to the capsule based carbon dioxide system and more density increase can be realized using such a system.

A capsule based carbon dioxide system also addresses the viscosity challenge because of the drag force of carbon dioxide on the capsules, and the inherent viscosity of carbon dioxide-philic molecules on the capsules.

SUMMARY OF THE INVENTION

The features and advantages of the present invention will be readily apparent to those skilled in the an upon a reading of the description of the preferred embodiments that follows.

Some embodiments of the invention are related to a process for preparing a dispersion of capsules for use downhole including providing capsules containing a dense liquid. Each capsule has a capsule wall that defines an inner area. The capsule wall also has an outer side. The capsules are functionalized by adding a carbon dioxide-philic compound to the outer side of the capsule wall. A dispersion is then prepared by adding the functionalized capsules to supercritical carbon dioxide such that a stable dispersion of capsules in supercritical carbon dioxide is achieved.

A stable capsule dispersion that is useful for enhanced oil recovery includes a disperse phase of a plurality of functionalized capsules. Each functionalized capsule contains the dense liquid in an inner area within the capsule wall. Each functionalized capsule is operable to be stably dispersed within supercritical carbon dioxide. The capsule wall of each functionalized capsule defines the inner area and has an outer side functionalized with a carbon dioxide-philic compound. The stable capsule dispersion also includes a continuous phase of supercritical carbon dioxide. The stable capsule dispersion has a density that is greater than the density of supercritical carbon dioxide at the same conditions (that is, temperature, pressure). The stable capsule dispersion also has a viscosity that is greater than the viscosity of supercritical carbon dioxide at the same conditions.

In some embodiments of the invention, the capsules are prepared by a process that includes providing a second liquid that is operable to form a liquid phase when combined with the dense liquid. A first monomer is added to the dense liquid to create a monomer-liquid composition. A second monomer is added to the second liquid to create a second monomer-liquid composition. The monomer-liquid composition is added to the second monomer-liquid composition and agitated to create a dispersion of monomer-liquid composition with the second. monomer-liquid composition such that intimate mixing is achieved. The agitation continues for a pre-determined amount of time such that polymerization of the first and second monomers is achieved at the liquid-liquid interface and capsules are formed.

Another embodiment of the invention is a process for enhancing oil recovery. The process includes providing capsules containing a dense liquid, each capsule having a capsule wall defining an inner area, the capsule wall having an outer side. The capsules are functionalized by adding a carbon dioxide-philic compound to the outer side of the capsule wall to create functionalized capsules. A capsule dispersion is then prepared by adding the functionalized capsules to supercritical carbon dioxide such that a stable dispersion of capsules in supercritical carbon dioxide is achieved with the stable dispersion having a density greater than supercritical carbon dioxide. The stable dispersion of capsules in supercritical carbon dioxide is then injected into a reservoir. Because the density of the stable dispersion of capsules in supercritical carbon dioxide is greater than the density of supercritical carbon dioxide alone, the injection will flood the reservoir more uniformly than supercritical carbon dioxide alone. Additionally, the injection should reduce viscous fingering of the supercritical carbon dioxide, increase sweep efficiency, and reduce early carbon dioxide breakthrough.

A further embodiment to the invention is a process for preparing a dispersion of capsules. The capsules contain a heavy liquid filler. Each capsule has a capsule will that defines an inner area. The capsule wall also has an outer side. The capsules are functionalized by adding a carbon dioxide-philic compound to the outer side of the capsule wall. A dispersion is then prepared by adding the functionalized capsules to supercritical carbon dioxide such that a stable dispersion of capsules in supercritical carbon dioxide is achieved.

In a further embodiment, a liquid capsule is prepared using a hydrogel. Water or heavy liquid can be stored in the hydrogel. The hydrogel based particles or capsules are functionalized by adding a carbon dioxide-philic compound to the outer side of the hydrogel capsule.

BRIEF DESCRIPTION OF DRAWINGS

So that the manner in which the features and advantages of the invention, as well as others that will become apparent, may be understood in more detail, a more particular description of the invention briefly summarized above may be had by reference to the embodiments thereof, which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION

Figure 1:
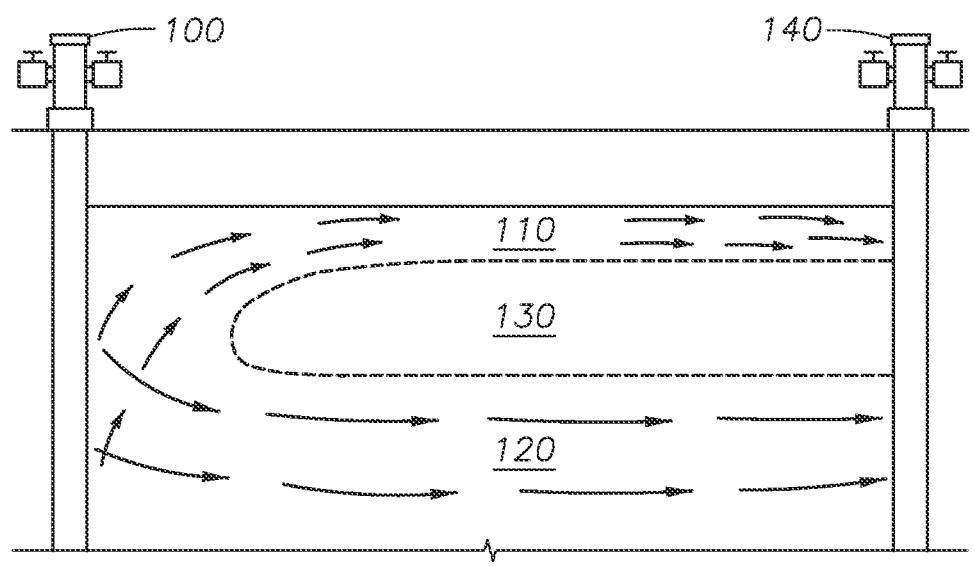
FIG. 1 is a drawing of a carbon dioxide enhanced oil recovery system known in the art.

Embodiments of the invention are related to a process for preparing a dispersion of capsules for use downhole including the steps of providing capsules containing a dense liquid. Each capsule has a capsule wail that defines an inner area. The capsule wall also has an outer side. The capsules are functionalized by adding a carbon dioxide-philic compound to the outer side of the capsule wall. A dispersion is then prepared by adding the functionalized capsules to supercritical carbon dioxide such that a stable dispersion of capsules in supercritical carbon dioxide is achieved.

A "dispersion" is a two-phase system where one phase consists of finely divided particles (often in the colloidal size range) that is distributed throughout a bulk substance, where the particles are the disperse or internal phase and the bulk substance the continuous or external phase. Solid-in-liquid colloidal dispersions (loosely called solutions) can be precipitated, in that larger particles will gradually coalesce and either rise to the top or settle out, depending on their specific gravity relative to the bulk substance.

In some embodiments of the invention, the capsules are prepared by a process that includes providing a second liquid that is operable to form a liquid phase when combined with the dense liquid. A first monomer is added to the dense liquid to create a monomer-liquid composition. A second monomer is added to the second liquid to create a second monomer-liquid composition. The monomer-liquid composition is added to the second monomer-liquid composition and agitated to create a dispersion of monomer-liquid composition with the second monomer-liquid composition such that intimate mixing is achieved, The agitation continues for a pre-determined amount of time such that polymerization of the first and second monomers is achieved at the liquid-liquid interface and capsules are formed. In further embodiments, the second liquid and the dense aqueous liquid are the same.

An embodiment of the invention is a process for enhancing oil recovery. The process includes providing capsules containing a dense liquid, each capsule having a capsule wall defining an inner area, and the capsule wall having an outer side. The capsules are functionalized by adding a carbon dioxide-philic compound to the outer side of the capsule wall to create functionalized capsules. A capsule dispersion is then prepared by adding the functionalized capsules to supercritical carbon dioxide such that a stable dispersion of capsules in supercritical carbon dioxide is achieved with the stable dispersion having a density greater than supercritical carbon dioxide. The stable dispersion of capsules in supercritical carbon dioxide is then injected into a reservoir. Because the density of the stable dispersion of capsules in supercritical carbon dioxide is greater than the density of supercritical carbon dioxide alone, the injection will flood the reservoir more uniformly than supercritical carbon dioxide alone. Additionally, the injection should reduce viscous fingering of the supercritical carbon dioxide, increase sweep efficiency, and reduce early carbon dioxide breakthrough.

The present invention will improve the recovery of oil over traditional enhanced oil recovery systems by enhancing recovery of oil from bypassed zones, For instance, FIG. 1 is a drawing of a traditional carbon dioxide enhanced oil recovery system. In the previously known systems, such as the one shown in FIG. 1, there is a gravity override, whereby the carbon dioxide injected at injection well 100 rises as a gas sweep 110, a water sweep 120 occurs below the gas sweep, and oil containing regions are completely untouched by the carbon dioxide. This results in a bypassed zone 130 from which oil is not fully recovered by the production at well 140. Embodiments of the present invention reduce or eliminate the bypassed zone 130. This is accomplished by increasing the density of the supercritical carbon dioxide and thus reducing the gravity override that is experienced within the system. Additionally, the viscosity of the supercritical carbon dioxide will be increased.

The capsule-based carbon dioxide system of the present invention addresses the viscosity challenge associated with traditional enhanced oil recovery systems because of the drag force of carbon dioxide on the capsules, and the inherent viscosity of carbon dioxide-philic molecules on the capsules in the present invention. This overcomes the viscous fingering of the traditional carbon dioxide enhanced oil recovery systems. Viscous fingering this caused by the lower viscosity of injected carbon dioxide in traditional carbon dioxide enhanced oil recovery processes. The present invention will reduce this fingering effect by increasing the viscosity of the supercritical carbon dioxide that is injected into a well, thus increasing the oil recovery from a given well.

Figure 2:
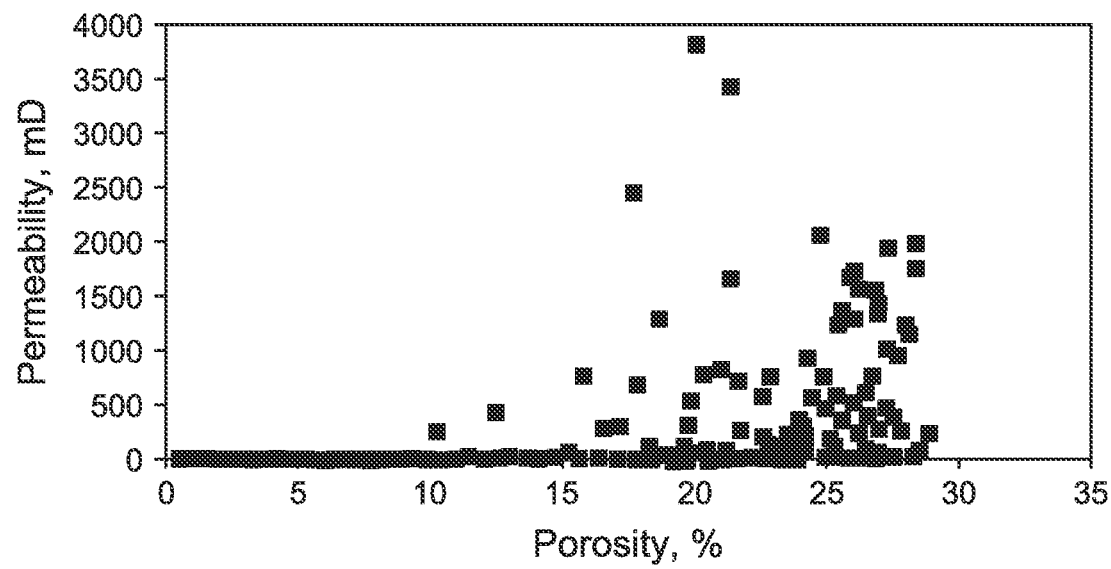
FIG. 2 shows that reservoir geology and heterogeneities can include high permeability streaks and fractures that can affect the sweep efficiency of a carbon dioxide enhanced oil recovery flood.

The present invention will also address the reservoir geology and heterogeneities issues of wells. As shown in FIG. 2, reservoir geology and heterogeneities can include high permeability streaks and fractures that can affect the sweep efficiency of a carbon dioxide enhanced oil recovery process. As shown in FIG. 2, which is a typical porosity v, permeability plot, as porosity increases, permeability increases, While the data shown in FIG. 2 as obtained for a reservoir in Saudi Arabia, the same general trend should be seen in other reservoirs as well. The present invention will address these issues by increasing the density and viscosity of the supercritical carbon dioxide, thus increasing the sweep efficiency of the carbon dioxide oil recovery process.

In further embodiments, the dense liquid of the present invention is non-supercritical at downhole operating pressure and temperature. In further embodiments, the dense liquid has a density of at least about 0.5 g/cc (grams per cubic centimeter). In further embodiments, the preferred dense liquid has density of at least about 0.55 g/cc. In further embodiments, the preferred dense liquid has density of at about least 0.60 g/cc. Preferred dense liquids include water, but can also include any other liquids which will have limited. environmental impact and which will not impede recovery of oil from a well, In some embodiments, the dense liquid is a dense aqueous liquid.

In further embodiments, the dense liquid is a heavy liquid filler. The filler can include any variety of heavy liquid filler but particularly preferred. heavy liquid fillers have densities of at least about 0.5 g/cc. In further embodiments, preferred heavy liquid tillers have densities of at least about 0.55 g/cc. In further embodiments, the preferred heavy liquid fillers have densities of at least about 0.60 g/cc. Additionally, in some embodiments, the heavy liquid filler will have limited environmental impact. In some embodiments, the heavy liquid fillers are selected from toluene, crude oil, ester, silicone oil, alcohols, acetone, and the like.

The first monomer can be any monomer capable of reacting with the second monomer to form a co-polymer capsule that can be functionalized with carbon dioxide-philic compounds. In preferred embodiments, the first monomer is an amine. In particularly preferred embodiments, the first monomer is triethylene tetramine. In other embodiments, the first monomer is selected from hexamethylene tetramine, ethylene diamine, hexamethylene diamine, diethylene triamine, and the like.

The second monomer can be any monomer capable of reacting with the first monomer to form a co-polymer capsule that can be functionalized with carbon dioxide-philic compounds. In preferred embodiments, the second monomer is an isocyanate. In particularly preferred embodiments, the isocyanate is polymeric diphenylmethane diisocyanate. In a preferred embodiment, the polymeric diphenylmethane diisocyanate is Mondur® MRS. In some embodiments, the second monomer is selected from isophorone diisocyante, Mondur® 489, hexamethylene diisocyanate, 1,4 phenylene diisocyanate, toluene 2,4 diisocyanate, and the like.

Carbon dioxide-philic compounds include fluorine containing compounds such as perfluoroethers, fluoroalkyls, fluoroacrylates, fluoroalkanes, and fluoroethers; silicon containing compounds including siloxanes, such as polydimethylsiloxane, and silicones; oxygenated hydrocarbon compounds such as propylene oxides; and other hydrocarbons such as polyvinyl acetate. Particularly preferred carbon dioxide-philic compounds include fluorinated carbon dioxide-soluble surfactant and oxygenated hydrocarbon carbon dioxide-philic molecules. In some embodiments, the carbon dioxide-philic compound is poly (1,1 dihydroperfluoroctyl acrylate).

A further embodiment of the invention is a process for preparing a dispersion of capsules. The capsules contain a heavy liquid filler that is heavier than carbon dioxide. Each capsule has a capsule wall that defines an inner area. The capsule wall also has an outer side. The capsules are functionalized by adding a carbon dioxide-philic compound to the outer side of the capsule wall. A dispersion is then prepared by adding the functionalized capsules to supercritical carbon dioxide such that a stable dispersion of capsules in supercritical carbon dioxide is achieved.

The capsules resulting from the processes described herein are operable to be stably dispersed in supercritical carbon dioxide, The resulting overall density of the supercritical carbon dioxide increases as a result of the stable dispersion of the capsules therein. Additionally, the dispersion of capsules in the supercritical carbon dioxide increases the viscosity of the supercritical carbon dioxide.

Figure 3:
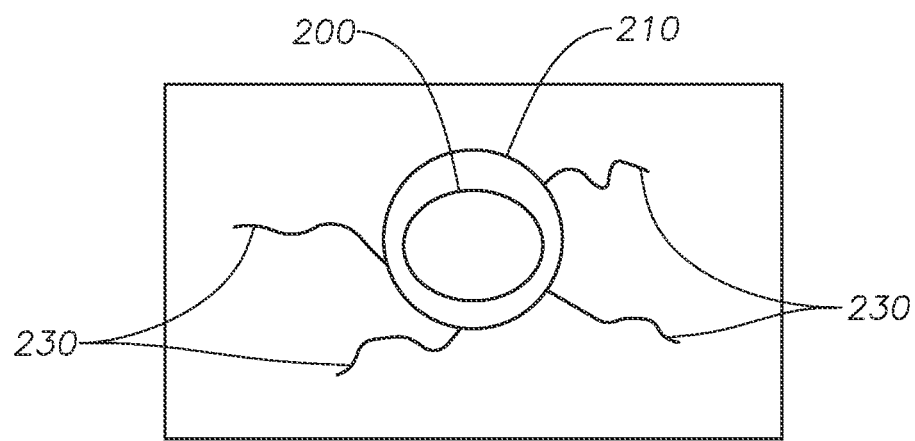
FIG. 3 shows a schematic of the carbon dioxide-philic capsule system according to an embodiment of the claimed invention.

The dispersion of capsules in supercritical carbon dioxide increases the viscosity of the supercritical carbon dioxide due to the drag force of carbon dioxide on the capsules, and the inherent viscosity of carbon dioxide-philic molecules on the capsules. A conceptual drawing of the carbon dioxide-philic compounds attached to the outer side of the capsule wall is shown in FIG. 3. As shown in FIG. 3, there is a filling in the inner area 200. in some embodiments, the filling is water or other dense liquid. Surrounding the inner area is a polymer capsule shell 210. Attached to the polymer capsule shell are carbon dioxide-philic functional groups 230. These capsules are dispersed in supercritical carbon dioxide.

According to some embodiments, the capsules are nano-scale. Nano-scale capsules according to the invention can range in size from about 110 nanometers to about 11,000 nanometers, Nano-scale capsules according to the invention can range in size from about 0.1 nanometers to about 1,000 nanometers. In some embodiments, the nano-scale capsules according to the invention can range in size from about 5 nanometers to about 500 nanometers, In some embodiments, the nano-scale capsules according to the invention can range in size from about 50 nanometers to about 250 nanometers. In some embodiments, the nano-scale capsules according to the invention can range in size from about 100 nanometers to about 200 nanometers, in some embodiments, the capsules are of uniform size. In further embodiments, the capsules are of uniform size such that the size of the capsules does not vary by more than about 30% percent. In other embodiments, the capsules are not of uniform size.

According to other embodiments, the capsules are micro-scale. Micro-scale capsules according to the invention can range in size from about 0.01 micrometers to 1,000 micrometers, In some embodiments, the micro-scale capsules according to the invention can range in size from about 5 micrometers to about 500 micrometers. In some embodiments, the micro-scale capsules according to the invention can range in size from about 50 micrometers to about 250 micrometers. In some embodiments, the micro-scale capsules according to the invention can range in size from about 100 micrometers to about 200 micrometers. In some embodiments, the capsules are of uniform size. In further embodiments, the capsules are of uniform size such that the size of the capsules does not vary by more than about 30% percent. In other embodiments, the capsules are not of uniform size.

In a further embodiment, a liquid capsule is prepared using a hydrogel. The hydrogel based particles or capsules are functionalized by adding a carbon dioxide-philic compound to the outer side of the hydrogel capsule. The particles or capsules can be made of any suitable hydrogel material, including gelatin, chitosan, starch, alginate, polyvinyl alcohol, polyethylene oxide, polyvinyl pyrrolidone, and polyisopropyl acrylamide. Hydrogel particles can be formed by various techniques. For example, chitosan can be dissolved in acidic water and then the dissolved chitosan can be forced to precipitate out in basic solution. The precipitate can be in the form of particles with a wide range of diameters, depending on experimental conditions. A crosslinking agent can then be introduced to ensure the integrity of the chitosan particles. The chitosan particles are hydrogel particles given the amount of water absorbed by the chitosan particles.

Embodiments of the present invention may suitably comprise, consist or consist essentially of the elements disclosed and may be practiced in the absence of an element not disclosed. For example, it can be recognized by those skilled in the art that certain steps can be combined into a single step.

Unless defined otherwise, all technical and scientific terms used have the same meaning as commonly understood by one of ordinary skill in the art to which this invention belongs.

The singular forms "a," "an," and "the" include plural referents, unless the context clearly dictates otherwise.

As used herein and in the appended claims, the words "comprise," "has," and "include" and all grammatical variations thereof are each intended to have an open, non-limiting meaning that does not exclude additional elements or steps.

Ranges may be expressed herein as from about one particular value, and/or to about another particular value. When such a range is expressed, it is to be understood that another embodiment is from the one particular value and/or to the other particular value, along with all combinations within said range.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The invention claimed is:

1. A process for enhancing oil recovery comprising the steps of:
    providing co-polymerized capsules containing a first liquid, the first liquid having a density greater than the density of supercritical carbon dioxide, each capsule having a capsule wall defining an inner area, the capsule wall having an outer side, the capsules prepared by a process comprising the steps of:
        providing a second liquid, the second liquid operable to form a liquid phase when combined with the first liquid;
        adding a first monomer to the first liquid to create a first monomer-liquid composition;
        adding a second monomer to the second liquid to create a second monomer-liquid composition;
        adding the first monomer-liquid composition to the second monomer-liquid composition;
        agitating the first monomer-liquid composition and the second monomer-liquid composition to create a dispersion of first monomer-liquid composition in the second monomer-liquid composition; and
        allowing the first and second monomers to diffuse and to co-polymerize at a liquid-liquid interface at a pre-determined time such that co-polymerized capsules are formed encapsulating the first liquid;
    after preparing the co-polymerized capsules, functionalizing the capsules by adding a carbon dioxide-philic compound to the outer side of the capsule wall to create functionalized capsules;
    preparing a capsule dispersion by adding the functionalized capsules to supercritical carbon dioxide such that a stable dispersion of capsules in supercritical carbon dioxide is achieved with the stable dispersion having a density greater than supercritical carbon dioxide; and
    injecting the stable dispersion of capsules in supercritical carbon dioxide into a reservoir.

2. The process according to claim 1, wherein said first liquid is non-supercritical at downhole operating pressure and temperature.

3. A process according to claim 1, wherein the first liquid has a density of at least about 0.5 g/cc.

4. A process according to claim 1, wherein the first monomer comprises triethylene tetramine.

5. A process according to claim 1, wherein the second monomer comprises polymeric diphenylmethane diisocyanate.

6. A process according to claim 1, wherein the carbon dioxide-philic compound comprises fluorinated carbon dioxide-soluble surfactant or oxygenated hydrocarbon carbon dioxide-philic molecules.

7. The process of claim 1 further comprising injecting water into the reservoir.

8. The process of claim 1 further comprising injecting a second amount of stable dispersion of capsules in supercritical carbon dioxide into the reservoir.

9. The process of claim 8 further comprising injecting a third amount of stable dispersion of capsules in supercritical carbon dioxide into the reservoir.

10. The process of claim 1 wherein the first liquid further comprises a heavy liquid filler.

11. The process according to claim 1, wherein the co-polymerized capsules include nano-scale capsules between about 0.1 nanometer to about 1,000 nanometers.

12. The process according to claim 1, wherein the co-polymerized capsules include nano-scale capsules between about 10 nanometers to about 1,000 nanometers.

13. The process according to claim 1, wherein the co-polymerized capsules include nano-scale capsules between about 50 nanometers to about 250 nanometers.

14. The process according to claim 1, wherein the co-polymerized capsules include micro-scale capsules between about 0.01 micrometer to about 1,000 micrometers.

15. The process according to claim 1, wherein the co-polymerized capsules include micro-scale capsules between about 5 micrometers to about 500 micrometers.

16. The process according to claim 1, wherein the co-polymerized capsules include micro-scale capsules between about 50 micrometers to about 250 micrometers.

\* \* \* \* \*